United States Patent
Kwon

(10) Patent No.: US 9,598,041 B2
(45) Date of Patent: Mar. 21, 2017

(54) AIRBAG FOR VEHICLE

(71) Applicant: Hyundai Mobis Co., Ltd., Yongin-si (KR)

(72) Inventor: Hae Wook Kwon, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 14/534,713

(22) Filed: Nov. 6, 2014

(65) Prior Publication Data

US 2015/0130170 A1    May 14, 2015

(30) Foreign Application Priority Data

Nov. 12, 2013 (KR) .................. 10-2013-0137185

(51) Int. Cl.
*B60R 21/216* (2011.01)
*B60R 21/16* (2006.01)

(52) U.S. Cl.
CPC ...... *B60R 21/216* (2013.01); *B60R 2021/161* (2013.01)

(58) Field of Classification Search
CPC ............ B60R 21/216; B60R 2021/161; B60R 2021/2161; B60R 2021/2163
See application file for complete search history.

(56) References Cited

U.S. PATENT DOCUMENTS

| | | | | |
|---|---|---|---|---|
| 5,195,776 A * | 3/1993 | Sakakida | ............ | B60R 21/215 280/730.1 |
| 5,340,149 A * | 8/1994 | Gajewski | ............ | B60R 21/215 280/728.3 |
| 5,452,913 A * | 9/1995 | Hansen | ............ | B60R 21/2171 280/728.1 |
| 5,588,674 A * | 12/1996 | Yoshimura | ............ | B60R 21/16 280/728.1 |
| 5,613,698 A * | 3/1997 | Patercsak | ............ | B60R 21/201 280/728.1 |
| 5,765,867 A * | 6/1998 | French | ............ | B60R 21/16 280/743.1 |
| 5,823,566 A * | 10/1998 | Manire | ............ | B60R 21/16 280/728.3 |
| 6,045,151 A * | 4/2000 | Wu | ............ | B60R 21/207 280/728.3 |
| 6,099,028 A * | 8/2000 | Seifert | ............ | B60R 21/16 280/728.3 |
| 6,131,944 A * | 10/2000 | Henkel | ............ | B60R 21/16 280/728.3 |
| 6,206,410 B1 * | 3/2001 | Brown | ............ | B60R 21/207 280/728.3 |
| 6,474,686 B1 * | 11/2002 | Higuchi | ............ | B60R 21/203 280/731 |
| 6,494,483 B2 * | 12/2002 | Floersheimer | ............ | B60R 21/261 280/740 |
| 6,942,242 B2 * | 9/2005 | Hawthorn | ............ | B60R 21/16 280/728.2 |
| 7,658,408 B2 * | 2/2010 | Zofchak | ............ | B60R 21/20 280/743.1 |

(Continued)

*Primary Examiner* — Barry Gooden, Jr.
(74) *Attorney, Agent, or Firm* — H.C. Park & Associates, PLC

(57) ABSTRACT

A vehicular airbag includes an airbag cushion, a cushion cover, and a flap. The cushion cover surrounds the airbag cushion. The flap is disposed between the airbag cushion and the cushion cover. The flap includes end portions joined to the cushion cover.

14 Claims, 3 Drawing Sheets

(56) References Cited

U.S. PATENT DOCUMENTS

| | | | |
|---|---|---|---|
| 8,407,968 B2* | 4/2013 | Lachat | B60R 21/201 |
| | | | 280/743.1 |
| 8,485,553 B1* | 7/2013 | Kuhne | B60R 21/205 |
| | | | 280/732 |
| 2003/0189319 A1* | 10/2003 | Soderquist | B60R 21/201 |
| | | | 280/728.3 |
| 2003/0234520 A1* | 12/2003 | Hawthorn | B60R 21/16 |
| | | | 280/728.1 |
| 2004/0212178 A1* | 10/2004 | Riesinger | B60R 21/2165 |
| | | | 280/730.2 |

* cited by examiner

AIRBAG FOR VEHICLE

CROSS-REFERENCE TO RELATED APPLICATION

This application claims priority from and the benefit of Korean Patent Application No. 10-2013-0137185, filed on Nov. 12, 2013, which is incorporated by reference for all purposes as if set forth herein.

BACKGROUND

Field

Exemplary embodiments relate to airbags, and, more particularly, to airbags configured to prevent (or otherwise reduce) the occurrence of injuries when an airbag cushion is deployed.

Discussion of the Background

Conventional airbags may be classified into various types according to a mounting position of the airbags in, for example, a transportation vehicle. An airbag is typically configured to protect (or otherwise reduce injuries to) an occupant of the transportation vehicle during an accident, such as a vehicular collision. It is noted that the airbag may include an airbag cushion, which may be rapidly inflated via high-pressure gas at a time of the accident, to cushion impact forces transferred to the occupant of the transportation vehicle during the accident. An airbag may be classified as, for example, a driver airbag configured to protect a driver of the transportation vehicle or a passenger airbag configured to protect a passenger in a front passenger seat of the transportation vehicle. Traditionally, driver airbags are mounted in a steering wheel, whereas passenger airbags are installed in a crash pad typically disposed in front of the front passenger seat.

To reduce a localized and relatively excessive impact force from the airbag cushion to, for example, the head of an occupant of the transportation vehicle when the occupant is abnormally seated (e.g., seated out of traditional seating positions), the airbag may utilize a low risk deployment (LRD) flap or other deployment structure similar to the LRD flap. The LRD flap will be, hereinafter, referred to as simply a flap. Typically, the flap may be folded together with the airbag cushion and configured to surround (or otherwise engulf) the head of the occupant as the airbag cushion is deployed and the head comes in contact with the airbag cushion. It is noted, however, that in conventional airbags incorporating such flaps, although the flap is to be spread as the airbag cushion is deployed, the flap may nonetheless protrude from the airbag in a folded, e.g., non-spread, state. In this manner, the flap may not surround the head of the occupant, and, as such, the occupant may surfer otherwise unnecessary injuries.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an airbag configured to prevent (or otherwise reduce) injury to an occupant when an airbag cushion is deployed by, for example, allowing a flap to be spread when the airbag cushion is deployed. It is noted that the airbag may be utilized in association with vehicles, such as transportation vehicles.

Additional aspects will be set forth in the detailed description which follows, and, in part, will be apparent from the disclosure, or may be learned by practice of the inventive concept.

According to exemplary embodiments, a vehicular airbag includes: an airbag cushion, a cushion cover, and a flap. The cushion cover surrounds the airbag cushion. The flap is disposed between the airbag cushion and the cushion cover. The flap includes end portions joined to the cushion cover. In a non-deployed state of the airbag cushion, the flap may be folded and disposed at an upper, exterior surface of the airbag cushion.

The cushion cover may include a tear line configured to tear in response to the airbag cushion being deployed. A first end portion of the end portions may be joined to a first portion of the cushion cover. A second end portion of the end portions may be joined to a second portion of the cushion cover. The tear line may be disposed between the first portion of the cushion cover and the second portion of the cushion cover. The first portion of the cushion cover may be a side portion of the cushion cover. The second portion of the cushion cover may be an upper portion of the cushion cover. It is noted that the second end portion may be detachably joined to the upper portion of the cushion cover, and, in response to a transition of the airbag cushion from a non-deployed state to a completely deployed state, the second end portion may be configured to detach from the upper portion of the cushion cover.

The end portions of the flap may be sewn to the cushion cover.

According to exemplary embodiments, an apparatus includes a housing, an airbag cushion, and a flap. The airbag cushion is supported in an interior cavity of the housing. The flap is disposed between an interior wall of the housing and the airbag cushion. A first end portion of the flap is coupled to a first portion of the housing and a second end portion of the flap is detachably coupled to a second portion of the housing.

In an uninflated state of the airbag cushion, the flap may be folded between the interior surface of the housing and the airbag cushion.

In a partially inflated state of the airbag cushion, the housing may be configured to tear to enable deployment of the airbag cushion. The housing may include a tear line. The housing may be configured to tear along the tear line in response to a transition of the airbag cushion to the partially inflated state. In the partially inflated state, the flap may be configured to unfold and guide a direction of the deployment of the airbag cushion. In a transitional state between the partially inflated state and a fully inflated state of the airbag cushion, the second end portion of the flap may be configured to detach from the second portion of the housing. In the transitional state, the direction of the deployment may extend between the first portion of the housing and the second end portion of the flap, and a surface of the airbag cushion may be exposed.

The first end portion of the flap may be coupled to the first portion of the housing via permanent stiches. The second end portion of the flap may be detachably coupled to the second portion of the housing via impermanent stiches.

A first portion of the airbag cushion may be coupled to a third portion of the housing.

The housing may include a tear line configured to tear in response to inflation of the airbag cushion. In an uninflated state of the airbag cushion, the airbag cushion may be coupled to a lower interior surface of the housing, the flap may be folded between an upper interior surface of the housing and an upper exterior surface of the airbag cushion, and folds of the flap may be disposed completely between an interior side surface of the housing and the tear line. The interior side surface of the housing may connect the lower interior surface of the housing to the upper interior surface of the housing. In a partially inflated state of the airbag cushion, the flap may be configured to unfold and guide a direction of deployment of the airbag cushion. In an uninflated state of the airbag cushion, the tear line may be disposed between the first portion of the housing and the second portion of the housing.

According to exemplary embodiments, when the airbag cushion is deployed, the flap will spread to enable the airbag cushion to come into contact with, for instance, an occupant of a transportation vehicle. In this manner, performance of the airbag may be improved and consistent deployment of the airbag cushion and unfolding of the flap may be improved. To this end, the safety of the occupant of the transportation vehicle may be increased.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
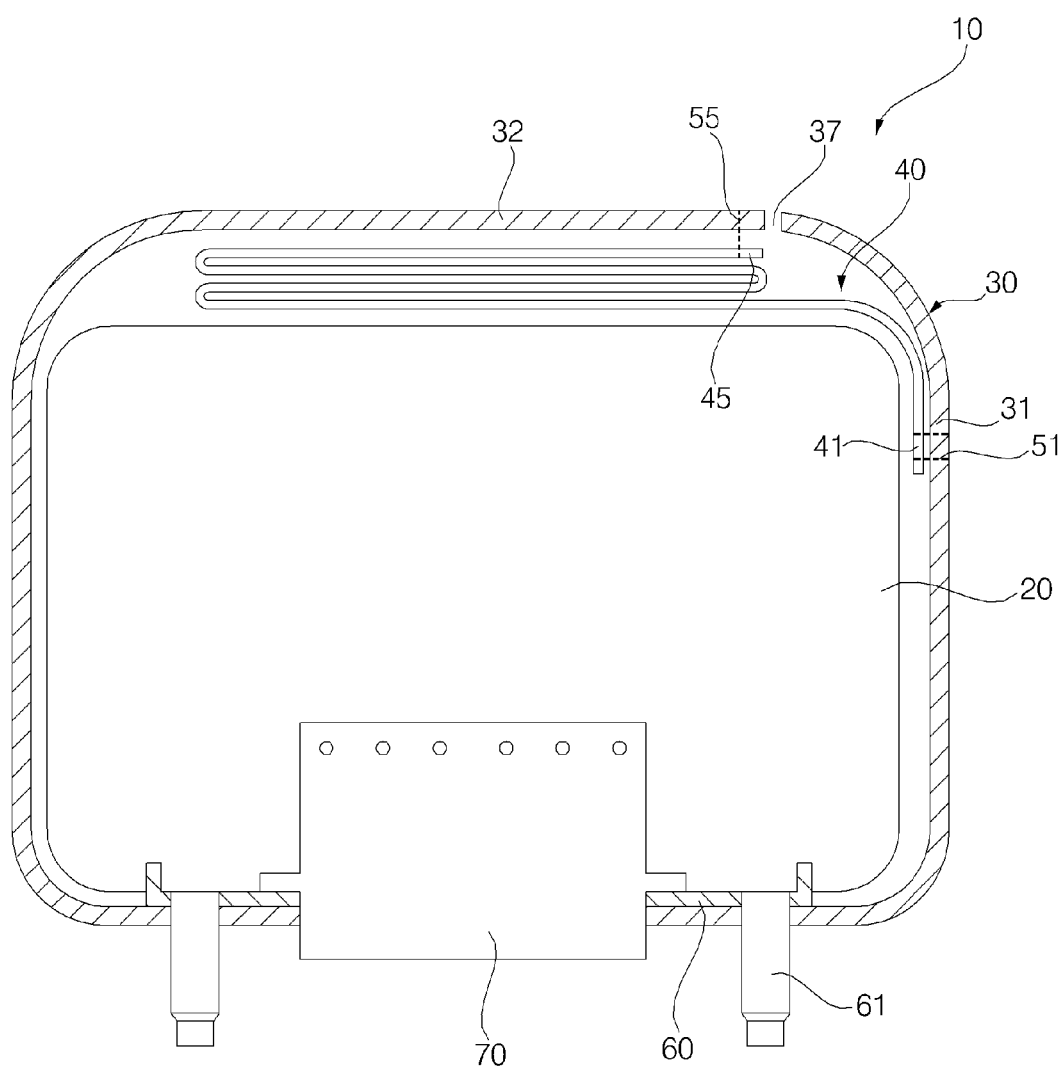
FIG. 1 is a cross-sectional view of an airbag, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Although various exemplary embodiments are described with respect to airbags utilized in association with vehicles, it is contemplated that various exemplary embodiments are also applicable to safety airbags in general, and, thereby, may be utilized in any suitable host environment, infrastructure, and/or system.

An exemplary airbag will now be described with reference to the drawings.

Figure 2:
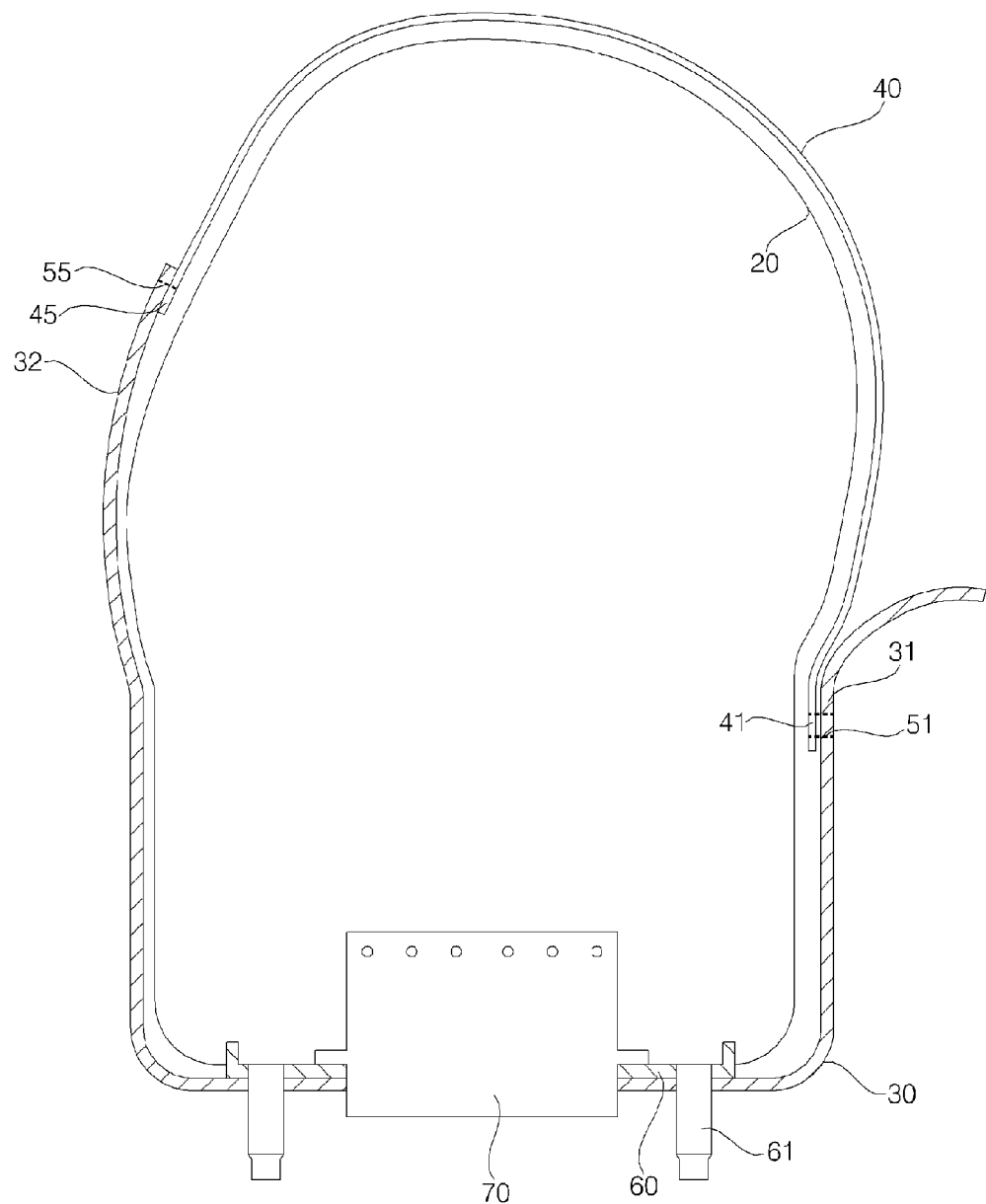
FIG. 2 is a cross-sectional view of the airbag of FIG. 1 in a partially deployed state, according to exemplary embodiments.
Figure 3:
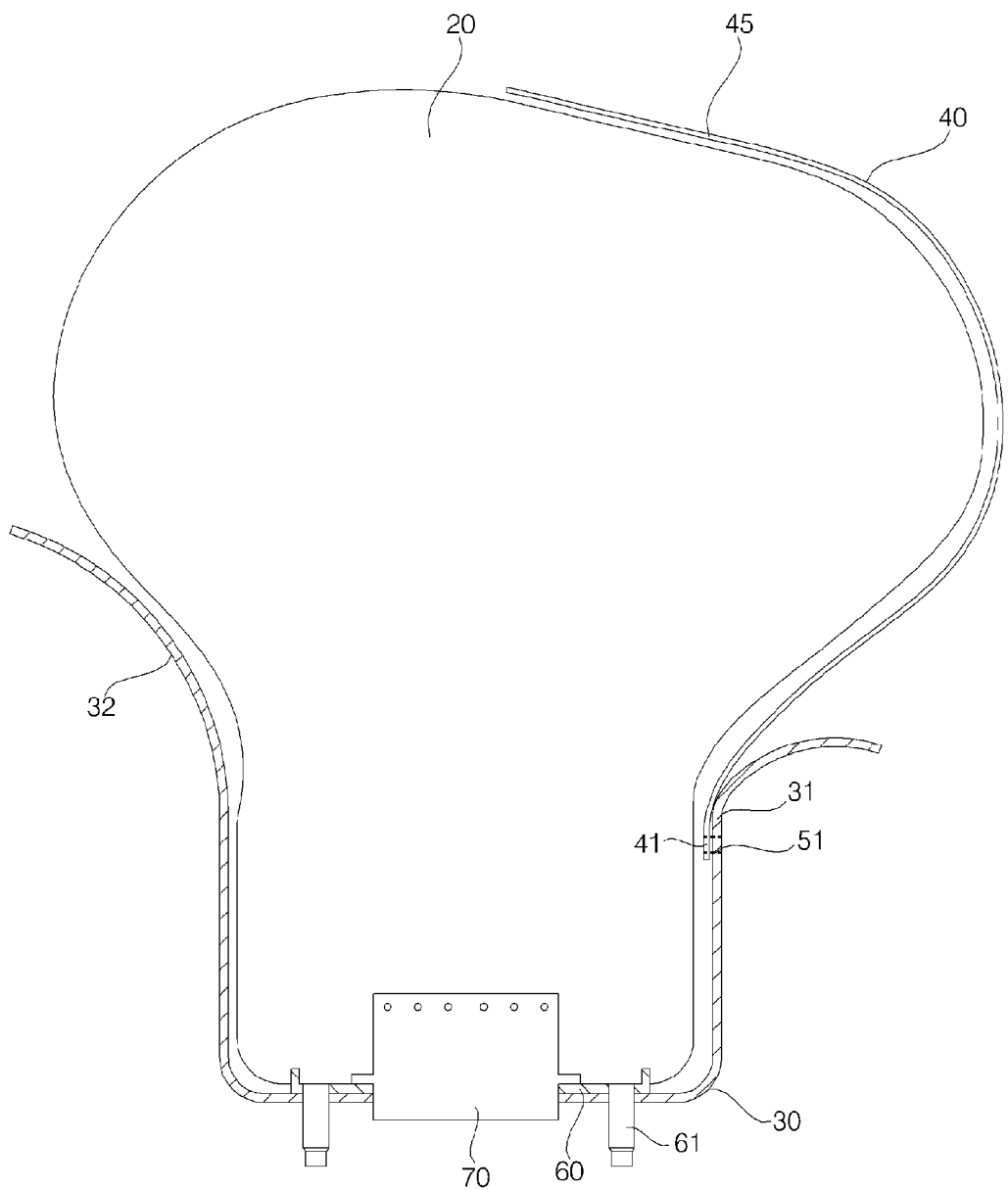
FIG. 3 is a cross-sectional view of the airbag of FIG. 1 in a fully (or substantially fully) deployed state, according to exemplary embodiments.

FIG. 1 is a cross-sectional view of an airbag, according to exemplary embodiments. FIGS. 2 and 3 are respective cross-sectional views of the airbag of FIG. 1 in a partially deployed state and a fully (or substantially fully) deployed state, according to exemplary embodiments.

Referring to FIGS. 1 to 3, an airbag 10, which may be utilized in, for example, a vehicle (e.g., a transportation vehicle), may include an airbag cushion 20, a cushion cover 30 (which may be disposed around (e.g., surrounding) the airbag cushion 20, and a flap 40 (which may be disposed between the airbag cushion 20 and the cushion cover 30). The flap 40 may have a first end portion 41 and a second end portion 45 that are respectively joined (or otherwise coupled) to the cushion cover 30. Although specific reference will be made to this particular implementation, it is also contemplated that airbag 10 may embody many forms and include multiple and/or alternative components.

According to exemplary embodiments, the airbag cushion 20 may be accommodated (or otherwise supported) in an interior cavity of the cushion cover 30. For example, the air bag cushion 20 may be folded and disposed in the interior cavity of the cushion cover 30. As will become more apparent below, the interior cavity region of the cushion cover 30 may communicate with (or otherwise be exposed to) an ambient environment via one or more tear lines, such as tear line 37. Although not illustrated, the airbag cushion 20 and the cushion cover 30 may be accommodated (or otherwise supported) in (or by) a housing, which may be mounted in (or otherwise coupled to) a crash pad of a vehicle.

As seen in FIG. 1, the cushion cover 30 may be formed in a rectangular shape; however, it is contemplated that any other suitable geometric configuration may be utilized in association with exemplary embodiments described herein. Cushion cover 30 may include one or more tear lines, such as, for example, tear line 37, which may be torn when the airbag cushion 20 is deployed. When the airbag cushion 20 is deployed, the tear line 37 may be torn, such that a first portion (e.g., an upper portion) 32 of the cushion cover 30 may be opened and rotated toward a side (e.g., an upper left side) of the airbag 10. It is contemplated that the rotation of the first portion 32 may occur substantially simultaneously with the opening of cushion cover 30 via tear line 37 to enable airbag cushion 20 to be deployed.

An inflator 70 may be installed at second portion (e.g., lower side portion) of the cushion cover 30. For instance, the inflator 70 may be mounted on a retainer 60 or other support structure. The retainer 60 may include one or more studs 61, which may penetrate through a surface (e.g., bottom surface) of the cushion cover 30, and, thereby, may protrude to an outside of the airbag 10. The studs 61 may be utilized to mount the airbag 10 in a determined position in, for instance, a vehicle.

In exemplary embodiments, the flap 40 may be disposed near the first portion 32 of the cushion cover 30 in a folded state between the cushion cover 30 and the airbag cushion 20. First end portion 41 of the flap 40 may be joined to a third portion (e.g., side portion) 31 of the cushion cover 30 via first sewing stiches 51, and the second end portion 45 of the flap 40 may be joined to the first portion 32 of the cushion cover 30 via second sewing stiches 55. First portion 32 may be disposed opposite the third portion 31 of the cushion cover 30 to which the first end portion 41 of the flap 40 may be joined, on the basis of tear line 37. It is noted, however, that second end portion 45 of the flap 40 may be temporarily joined (e.g., detachably coupled) to the first portion 32 of the cushion cover 30, such that the second end portion 45 of the flap 40 may be torn from the first portion 32 of the cushion cover 30 when the airbag cushion 20 is fully (or substantially fully) deployed.

An operation of the airbag of FIG. 1 will now be described in association with FIGS. 1 to 3.

In response to a collision (e.g., a vehicular collision), high-pressure gas may be discharged from the inflator 70 into the airbag cushion 20. In this manner, the airbag cushion 20 may be deployed, and, thereby, may traverse through various states of deployment, as will become more apparent below.

When the airbag cushion 20 begins to be deployed, the flap 40 folded at the upper side of the airbag cushion 20 may being to be spread, and the tear line 37 formed in the cushion cover 30 may be torn. As illustrated in FIG. 2, the flap 40 is unfolded and the airbag cushion 20 has been partially deployed away from inflator 70, e.g., initially toward first portion 32 of the cushion cover 30. It is noted that in the partially deployed state of FIG. 2, second end portion 45 of flap 40 remains detachably coupled to first portion 32 of cushion cover 30 via second sewing stiches 55.

Before the airbag cushion 20 is deployed to a predetermined size, the second end portion 45 of the flap 40 controls a direction in which the airbag cushion 20 is deployed, while the second end portion 45 remains detachably coupled to the first portion 32 of the cushion cover 30. As the airbag cushion 20 is further deployed, the second end portion 45 of the flap 40 will be torn from the first portion 32 of the cushion cover 30, to enable the airbag cushion 20 to be fully deployed, such as illustrated in FIG. 3. In this fully (or substantially fully) deployed state, the flap 40 may be deployed toward the head (or other body part) of an occupant (not shown) of the vehicle (not illustrated) to protect or at least reduce the occurrence of greater injury to the occupant. It is noted that the exposed portion of the airbag cushion 20 may contact the head (or other body part) of the occupant.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An apparatus, comprising:
   a housing;

an airbag cushion supported in an interior cavity of the housing; and a flap disposed between an interior wall of the housing and the airbag cushion, wherein:

a first end portion of the flap is coupled to a first portion of the housing via permanent stiches; and a second end portion of the flap is detachably coupled to a second portion of the housing via impermanent stiches.

2. The apparatus of claim 1, wherein, in an uninflated state of the airbag cushion, the flap is folded between the interior surface of the housing and the airbag cushion.

3. The apparatus of claim 1, wherein a first portion of the airbag cushion is coupled to a third portion of the housing.

4. The apparatus of claim 1, wherein, in a partially inflated state of the airbag cushion, the housing is configured to tear to enable deployment of the airbag cushion.

5. The apparatus of claim 4, wherein:

the housing comprises a tear line; and the housing is configured to tear along the tear line in response to a transition of the airbag cushion to the partially inflated state.

6. The apparatus of claim 4, wherein, in the partially inflated state, the flap is configured to unfold and guide a direction of the deployment of the airbag cushion.

7. The apparatus of claim 6, wherein, in a transitional state between the partially inflated state and a fully inflated state of the airbag cushion, the second end portion of the flap is configured to detach from the second portion of the housing.

8. The apparatus of claim 7, wherein, in the transitional state:

the direction of the deployment extends between the first portion of the housing and the second end portion of the flap; and a surface of the airbag cushion is exposed.

9. The apparatus of claim 1, wherein the housing comprises a tear line configured to tear in response to inflation of the airbag cushion.

10. The apparatus of claim 9, wherein, in an uninflated state of the airbag cushion, the tear line is disposed between the first portion of the housing and the second portion of the housing.

11. The apparatus of claim 9, wherein, in an uninflated state of the airbag cushion:

the airbag cushion is coupled to a lower interior surface of the housing;

the flap is folded between an upper interior surface of the housing and an upper exterior surface of the airbag cushion; and folds of the flap are disposed completely between an interior side surface of the housing and the tear line, the interior side surface of the housing connecting the lower interior surface of the housing to the upper interior surface of the housing.

12. The apparatus of claim 11, wherein, in a partially inflated state of the airbag cushion, the flap is configured to unfold and guide a direction of deployment of the airbag cushion.

13. A vehicular airbag, comprising:

an airbag cushion;

a cushion cover surrounding the airbag cushion; and a flap disposed between the airbag cushion and the cushion cover, wherein:

the flap comprises end portions sewn to the cushion cover;

the cushion cover comprises a tear line configured to tear in response to the airbag cushion being deployed;

a first end portion of the end portions is joined to a first portion of the cushion cover, the first portion of the cushion cover being a side portion of the cushion cover;

a second end portion of the end portions is joined to a second portion of the cushion cover, the second portion of the cushion cover being an upper portion of the cushion cover;

the tear line is disposed between the first portion of the cushion cover and the second portion of the cushion cover;

the second end portion is detachably joined to the upper portion of the cushion cover; and in response to a transition of the airbag from a non-deployed state to a completely deployed state, the second end portion is configured to detach from the upper portion of the cushion cover.

14. The vehicular airbag of claim 13, wherein, in the non-deployed state of the airbag cushion, the flap is folded and disposed at an upper, exterior surface of the airbag cushion.

* * * * *